United States Patent
Levi et al.

(10) Patent No.: US 10,466,963 B2
(45) Date of Patent: Nov. 5, 2019

(54) CONNECTING MULTIPLE MOBILE DEVICES TO A SMART HOME ASSISTANT ACCOUNT

(71) Applicant: AIQUDO, INC., San Jose, CA (US)

(72) Inventors: Matan Levi, Santa Clara, CA (US);
Mark Robinson, Union City, CA (US);
Rajat Mukherjee, San Jose, CA (US);
Kiran Bindhu Hemaraj, Trivandrum (IN); Sunil Patil, Fremont, CA (US)

(73) Assignee: AIQUDO, INC., Campbell, CA (US)

( * ) Notice: Subject to any disclaimer, the term of this patent is extended or adjusted under 35 U.S.C. 154(b) by 0 days.

(21) Appl. No.: 15/935,983

(22) Filed: Mar. 26, 2018

(65) Prior Publication Data

US 2018/0337799 A1 Nov. 22, 2018

Related U.S. Application Data

(60) Provisional application No. 62/576,766, filed on Oct. 25, 2017, provisional application No. 62/539,866, (Continued)

(51) Int. Cl.
*G06F 3/16* (2006.01)
*G06F 3/0484* (2013.01)
(Continued)

(52) U.S. Cl.
CPC ............ *G06F 3/167* (2013.01); *G06F 3/0484* (2013.01); *G10L 15/22* (2013.01); *G10L 15/30* (2013.01);
(Continued)

(58) Field of Classification Search
CPC .................. H04L 12/2816; H04L 12/2818
See application file for complete search history.

(56) References Cited

U.S. PATENT DOCUMENTS

2008/0201306 A1  8/2008  Cooper et al.
2011/0111741 A1* 5/2011  Connors ......... H04M 1/274516
                                                    455/414.3
(Continued)

OTHER PUBLICATIONS

International Search Report and Written Opinion dated Jul. 26, 2018 in International Patent Application No. PCT/US18/33342, 10 pages.

*Primary Examiner* — Jinsong Hu
*Assistant Examiner* — Farideh Madani
(74) *Attorney, Agent, or Firm* — Shook, Hardy & Bacon L.L.P.

(57) ABSTRACT

Various embodiments, methods and systems for implementing a digital assistant connectivity system are provided. In operation, a request to receive a unique identifier is communicated from a digital assistant device. The unique identifier is utilized to pair the digital assistant device with a smart assistant device. The unique identifier is received from and generated by a digital assistant server to correspond with the digital assistant device and a corresponding digital assistant device application instance. An instruction to perform an action on the digital assistant device is received at the digital assistant device application. The instruction is communicated based on an established command-driven session between the digital assistant device application and the smart assistant device. The command-driven session is associated with the unique identifier that paired the digital assistant device and the smart assistant device. The action is executed on the digital assistant device based on commands received by the smart assistant device.

19 Claims, 6 Drawing Sheets

Related U.S. Application Data filed on Aug. 1, 2017, provisional application No. 62/576,804, filed on Oct. 25, 2017, provisional application No. 62/509,534, filed on May 22, 2017, provisional application No. 62/508,181, filed on May 18, 2017.

(51) Int. Cl.

| | |
|---|---|
| *H04W 76/14* | (2018.01) |
| *G10L 15/22* | (2006.01) |
| *G10L 15/30* | (2013.01) |
| *H04L 12/28* | (2006.01) |
| *H04L 29/08* | (2006.01) |
| *G10L 15/26* | (2006.01) |

(52) U.S. Cl.
CPC ........ *H04L 12/2816* (2013.01); *H04L 67/141* (2013.01); *H04W 76/14* (2018.02); *G10L 15/26* (2013.01); *G10L 2015/223* (2013.01); *H04L 67/306* (2013.01)

(56) References Cited

U.S. PATENT DOCUMENTS

| | | | |
|---|---|---|---|
| 2011/0273625 A1* | 11/2011 | McMahon | H04N 21/6334 348/734 |
| 2016/0027399 A1* | 1/2016 | Wilde | G06F 13/382 345/520 |
| 2016/0050160 A1* | 2/2016 | Li | H04L 63/0442 713/176 |
| 2016/0173578 A1* | 6/2016 | Sharma | G06F 17/2785 709/203 |
| 2017/0205854 A1* | 7/2017 | Zenoff | G06F 1/163 |

\* cited by examiner

CONNECTING MULTIPLE MOBILE DEVICES TO A SMART HOME ASSISTANT ACCOUNT

CROSS-REFERENCE TO RELATED APPLICATIONS

This application is related by subject matter to and claims the benefit of U.S. Provisional Patent Application No. 62/508,181, filed May 18, 2017, entitled "SYSTEMS AND METHODS FOR CROWDSOURCED ACTIONS AND COMMANDS," U.S. Provisional Patent Application No. 62/509,534, filed May 22, 2017, entitled "CONNECTING MULTIPLE MOBILE DEVICES TO A SMART HOME ASSISTANT ACCOUNT," U.S. Provisional Patent Application No. 62/576,804, filed Oct. 25, 2017, entitled "CONNECTING MULTIPLE MOBILE DEVICES TO A SMART HOME ASSISTANT ACCOUNT," U.S. Provisional Patent Application No. 62/539,866, filed Aug. 1, 2017, entitled "OPTIMIZING DISPLAY ENGAGEMENT IN ACTION AUTOMATION," and U.S. Provisional Patent Application No. 62/576,766, filed Oct. 25, 2017, entitled "A CROWDSOURCED DIGITAL ASISSTANT SYSTEM," which are incorporated herein by reference in their entirety.

BACKGROUND

Connectivity between devices for performing different types of tasks is becoming more and more important as evidenced by the growth in Internet-of-things (IoT) technology. As IoT connectivity expands, so does the potential for digital assistants to control and interoperate with other devices. Currently, inter-device connectivity technology by way of digital assistants is at its infancy stage and the ability for digital assistants to perform operations across various devices (e.g., a smart home assistant device and a mobile device) and applications is limited by developer ecosystems and other proprietary implementations. In an ideal implementation, a digital assistant should seamlessly be employed to allow a user to execute actions on their mobile devices (e.g., mobile phones, wearables) via a smart home assistant device. Even though some smart home assistant devices have "always-listening" modes, the specific actions that they perform are not executable on mobile devices or enabled via the smart home assistant application installed on a corresponding mobile device, which is where users spend a majority of their time. Moreover, conventional digital assistants do not assist in seamlessly connecting mobile devices to smart home assistant devices such that the smart home assistant devices perform desired actions on the mobile devices.

SUMMARY

Embodiments of the present invention relate to methods, systems and computer storage media for automatically connecting computing devices, in particular, connecting a digital assistant (e.g., digital assistant device application, virtual assistant, intelligent personal assistant, software agent) on a digital assistant device (e.g., mobile phone, tablet, wearable) to a smart assistant device (e.g., Amazon® Echo®, Google® Home®, smart home assistant, smart speakers) for performing digital assistant device operations on the digital assistant device. For example, a voice command received at a smart assistant device can trigger an action that is performed on a digital assistant device that is executing the digital assistant device application.

Automating connectivity between a digital assistant device and a smart assistant device is based on activated communication sessions and command-driven sessions that are systematically initiated and activated based on a unique identifier, while using a plurality of components in a digital assistant connectivity system (e.g., digital application device application, digital assistant server application, smart assistant device application and smart assistant server application). In addition, connectivity between devices can be based, at least in part on, repurposing a built-in account service that the smart assistant device may exclusively support for providing smart assistant service. For example, a smart assistant device can support an account service that limits the smart assistant device to a single account or to a defined set of accounts for connecting to and performing operations using the smart assistant device. The account service on the smart assistant device can be repurposed in order to have multiple digital assistant devices each seamlessly connect to the smart assistant device. Further, based on establishing a command-driven session (e.g., voice-command-driven session) between a digital assistant device application and a smart assistant device application, the digital assistant device application is controllable via the smart assistant device to perform actions on the digital assistant device.

In operation, a request to receive a unique identifier is communicated from a digital assistant device application, executing on a digital assistant device, to a digital assistant server application executing on a digital assistant server. The unique identifier is requested such that the unique identifier is utilized to pair the digital assistant device with a smart assistant device. The request is received at the digital assistant server. The unique identifier is generated at the digital assistant server application to correspond with the digital assistant device and the instance of the digital assistant device application. The unique identifier is communicated from the digital assistant server application and received at the digital assistant device application via the digital assistant device.

The unique identifier is then communicated to a smart assistant device application executing on the smart assistant device. Based on receiving the unique identifier at the smart assistant device application, the smart assistant device application communicates a pairing command, which includes the unique identifier, to a smart assistant server application executing on a smart assistant server. The pairing command is communicated to the smart assistant server application for the smart assistant server application to initiate communications with the digital assistant server application executing on the digital assistant server. The digital assistant server application implements a third-party command-driven service for communicating with digital assistant device applications executing on digital assistant devices. Based on receiving the pairing command, the smart assistant server application initiates communications with the digital assistant server application.

Based on initiating communications between the smart assistant server application and the digital assistant server application, a communication session is established between the digital assistant server application and the smart assistant device application. Establishing the communication session is based on communicating from the smart assistant server application to the digital assistant server application at least a portion of the pairing command that includes the unique identifier during the process of initiating communications. Based on the digital assistant server application receiving at least a portion of the pairing command having the unique identifier, the digital assistant server application establishes a command-driven session (e.g., voice-command-driven session) between the digital assistant device application and the smart assistant device application.

The smart assistant device application receives, processes, and communicates, to the smart assistant server application, a command. The smart assistant server application receives, processes and communicates, to the digital assistant server component, the command. The digital assistant server application receives and processes the command, and based on the command, generates and communicates, to the digital assistant device application, an instruction to perform an action on the digital assistant device. The instruction is communicated to the digital assistant device application based on the command-driven session between the digital assistant device application and the smart assistant device application. The digital assistant device application receives and processes the instruction received at the digital assistant device application from the digital assistant server application. The action is executed on the digital assistant device in response to receiving the instruction to perform the action. The action is executed by the digital assistant device application on the digital assistant device.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the attached drawing figures, wherein.

DETAILED DESCRIPTION

Figure 1:
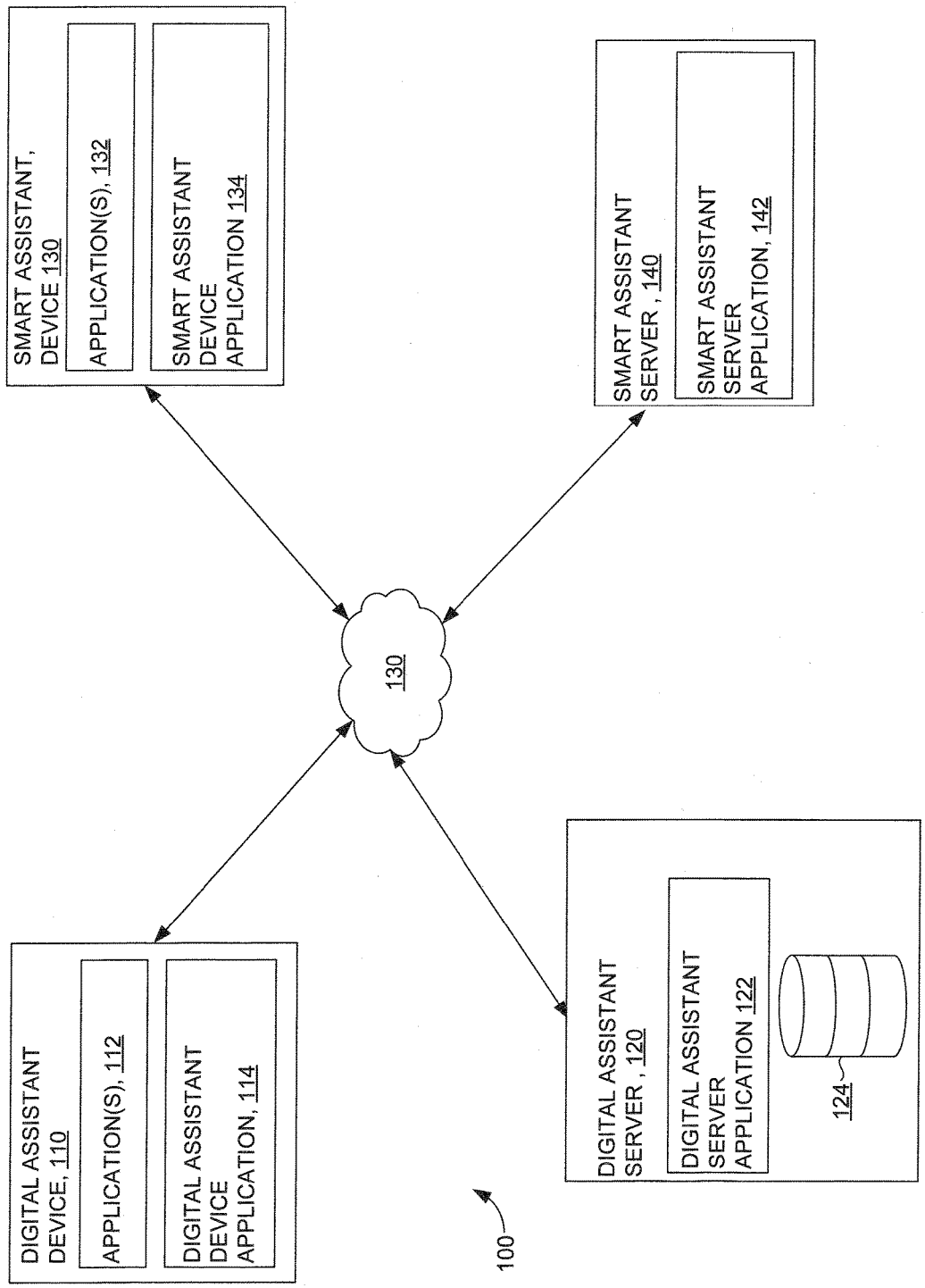
FIG. 1 depicts an exemplary operating environment in accordance with some embodiments of the present disclosure.

As electronic devices become more integrated into our daily lives, so do the methods in which we can interface with them. Digital assistants have become ubiquitous in a variety of consumer electronic devices. Some modern day digital assistants employ speech recognition technologies to provide a conversational interface between users and electronic devices. These digital assistants can employ various algorithms, such as natural language processing, to improve interpretations of commands received from a user.

Different types of digital assistants have found a place in many peoples' homes, providing voice-activated services that can assist users with various tasks, from a basic level to a very advanced level. Typically, these digital assistants are implemented into a stationary device (e.g., smart assistant device) or mobile phone (e.g., digital assistant device) and activated by speech detection or manual activation (e.g., a button press). Once activated, the digital assistants receive a voice command, and relay the command to a remote server of the service provider (or third-party service provider) for processing. The remote server can then provide a response or an acknowledgement of the received command to the digital assistant for output to the user.

Digital assistants enable a seamless interface between users and their devices, and can provide a much faster means for the exchange of input and output information. One digital assistant, particularly the "Q" digital assistant developed by Aiqudo Inc., headquartered in San Jose, Calif., includes integrated automation using digital assistant. In other words, the "Q" digital assistant can, among many other things, perform a series of predefined tasks (e.g., "action") based on the receipt of a predefined input (e.g., "command") to accomplish a desired result. In addition, the "Q" digital assistant provides a plethora of additional services, such as crowd-sourced definitions of various commands and actions that are quality-assured by intelligent algorithms, essentially eliminating the need for a novice user to "train" their digital assistant to work with their preferred applications.

Among other things, the "Q" digital assistant receives a voice command and translates the speech to text. The digital assistant can then employ natural language processing to analyze the text for any recognized commands that may be serviced by applications already-installed or required-to-be-installed by the user. In some instances, the commands may include parameters that are recognized by the digital assistant as well. Provided that an application capable to service the command is installed on the user device, the "Q" assistant can then automate a series of predefined tasks, which can include, by way of example only: launching the application, emulating touch inputs for button presses or application navigation, passing parameters into application form fields, waiting for application or remotely-communicated responses, and many more, until the automated "action" is fully executed and the user is provided with a result of the provided command.

As described, when the automated action is being executed by the digital assistant, or when the various steps associated with an automated action are being performed, the various steps required to complete the action are emulated by the digital assistant. In essence, and by way of example only, the user can provide a voice command to the digital assistant, such as "get me a ride to the airport," the digital assistant can determine that a particular application can provide this service, determine a current location of the user and a nearest airport, and launch a ridesharing application that the digital assistant can pass the "current location" and "airport" parameters to. Any additional inputs, such as a "submit" button can also be automated by the digital assistant provided that such tasks are included in the predefined action corresponding to the received command.

Conventional digital assistants are mostly limited to the capabilities that the service provider and their developers implement. More specifically, the number of operations (e.g., actions) that a conventional digital assistant can perform in response to a verbal command is limited, not only by the inability of the digital assistant to accurately understand the consumer, but further by a limited defined or programmed skillset for the digital assistant. For example, a digital assistant can only perform actions based on the predefined command-action combinations or a digital assistant is limited in its recognition of a command or set of commands predefined by the developer.

Some service providers and developers provide an open interface (e.g., an API) such that third-parties can develop custom services that can essentially "plug in" to the digital assistant and provide additional services. Nonetheless, digital assistants, and smart assistants in particular, often still have to operate based on a built-in account service. Smart assistants can be operationally linked to a single account or a set of accounts of the account service. The accounts can be predefined or preconfigured via the account service and/or linked to a selected smart assistant through a registration process. A mobile device associated with a selected account can then operate with the smart assistant, for example, to receive communication via the smart assistant.

The requirement to register with an account service for connecting to a mobile device hinders an automatic and seamless capacity for mobile devices to connect to the smart assistant. The account-device framework can be extremely prohibitive for several reasons, for example, a user may have multiple mobile devices that the user would like to use inter-changeably to operate with the smart assistant to perform desired actions, registering a mobile device with the account service can be cumbersome, and some users may be reluctant due to security concerns over sharing personal information when registering their devices.

In addition, even pairing a smart assistant with a mobile device were somehow simplified, existing pairing techniques still have several limitations in functionality that could otherwise be possible to an improved solution. For example, conventional systems that only support pairing electronic devices to a smart assistant do not support customized and/or learned commands, dialects, or other features that smart assistant device can facilitate. Further, support for multiple mobile device connectivity and operability in also limited in that conventional systems do not support multiple mobile devices that are configured to execute actions concurrently with a smart assistant device. Support for multiple mobile devices operating concurrently can be critical for specific scenarios including real-time collaboration, education, social and group applications. In this regard, a digital assistant connectivity system that addresses the above-identified limitations in seamless connectivity and interoperability can be improve the state of digital assistant technology.

Embodiments of the present invention provide simple and efficient methods, systems and computer storage media for automatically connecting computing devices, in particular, connecting a digital assistant device to a smart assistant for performing digital assistant device services. Automating connectivity between a digital assistant device and a smart assistant device is based on activated communication sessions and command-driven sessions that are systematically initiated and activated based on a unique identifier, while using a plurality of components in a digital assistant connectivity system (e.g., digital application device application, digital assistant server application, smart assistant device application and smart assistant server application). In addition, connectivity between devices can be based, at least in part on, repurposing a built-in account service that the smart assistant device may exclusively support for providing smart assistant service. For example, a smart assistant device can support an account service that limits the smart assistant device to a single account or to a defined set of accounts for connecting to and performing operations using the smart assistant device. The account service on the smart assistant device can be repurposed in order to have multiple digital assistant devices each seamlessly connect to the smart assistant device. Further, based on establishing a command-driven session (e.g., voice-command-driven session) between a digital assistant device application and a smart assistant device application, the digital assistant device application is controllable via the smart assistant device to perform actions on the digital assistant device.

The digital assistant connectivity system operates based on several components on a variety of computing devices (e.g., digital assistant device, smart assistant device, smart assistant server, digital assistant server) that operate in the digital assistant connectivity system. As used herein, digital assistant device, smart assistant device, smart assistant server, digital assistant server can refer to a corresponding mobile device, a smart home assistant device, a smart home assistant server and a digital assistant server. The devices and servers may execute, operate or run hardware or software components (e.g., digital assistant device applications, smart assistant device applications, smart assistant server applications, digital assistant server applications respectively) to support automated connectivity.

Multiple digital assistant devices can be configured via a digital assistant server to interoperate with a smart assistant device. The smart assistant device can be, but not limited to a standalone device (e.g., Amazon® Echo®, Google® Home®, etc.). Embodiments of the present invention contemplate a smart assistant device that can be any electronic device operable to provide access to the smart assistant device services. In this regard, computing devices, such as a mobile device, a television, a wearable device, or any other user device described herein in accordance with FIG. 1, operable to provide the same or similar smart assistant device features of the described smart assistant device, are contemplated with the described embodiments. As such, the described smart assistant device and smart assistant server, and are not limited to a "home" environment, and can be different types of computing devices that support the functionality described herein.

The digital assistant connectivity system can support several different protocols to establish connectivity between a digital assistant device (e.g., a mobile phone) and a smart assistant device (e.g., a smart home assistant) and also to support different types of functionality between the digital assistant device and the smart assistant device. At a high level, a user can request a unique identifier to establish a command-driven session between a digital assistant device application executing a digital assistant device and a smart assistant device application executing on a smart assistant device. The request can be received at the digital assistant device application. For example, the user can enter a request via an interface of the digital assistant device application, and more specifically, a voice command communicated to the digital assistant device application executing on the digital assistant device. The digital assistant device application communicates the request to a digital application server executing a digital application server application that supports operations on the digital assistant server.

The digital assistant server and digital assistant server application operate to generate, manage and process the unique identifier. The unique identifier can be generated using a variety of techniques and constructed based on any number of suitable formats. For example, the unique identifier can be generated using a random identifier generator and the unique identifier can include a number of predefined characters to reduce a likelihood of accidental usage of previously-generated unique identifiers. The digital assistant server can employ data structures and safeguards for managing unique identifiers. For example, the digital assistant server can maintain records of generated unique identifiers and employ algorithms to avoid duplication and reduce closely-placed QWERTY characters of generated unique identifiers. In one embodiment, the unique identifier operates as a pin code, at least temporarily, that is a reference for the link between the digital assistant device and the smart assistant device during a command-driven session. The unique identifier can operate as an authentication code for processing operations associated with the corresponding digital assistant device via the smart assistant device, smart assistant device server and the digital assistant server.

The unique identifier can be associated with the particular instance of a digital assistant device application. In this regard, for multiple digital assistant device applications executing on corresponding digital assistant devices, each digital assistant device having an instance of the digital assistant device application, can be paired with a smart assistant device. In one embodiment, an account service account of the smart assistant device is repurposed from its intended programmed functionality to support multiple digital assistant devices. For example, the account can be used as a link for each of a plurality of digital assistant devices connecting to the smart assistant device. Multiple accounts of the smart assistant device can also exist such that a first set of digital assistant devices can be associated with a first account and a second set of digital assistant devices can be associated with a second account. For example, a mobile phone and tablet of a first user can be associated with account A and a second mobile phone and smart watch of a second user can be associated with account B, where upon establishing connectivity, each device can interoperate concurrently with the smart assistant device.

Upon generating the unique identifier, the digital assistant server communicates the unique identifier to the digital assistant device. The unique identifier can be received at the digital assistant device and preferably via an interface associated with digital assistant device. Upon receiving the unique identifier, the user can trigger communication of the unique identifier to the smart assistant device. The unique identifier can be communicated to the smart assistant device in a variety of ways. In one embodiment, a voice command can be performed using the unique identifier to begin pairing the digital assistant device with the smart assistant device. For example, a voice command that includes the unique identifier can be performed, where the voice command is processed at the smart assistant device. Further, the device components and server components of the digital assistant connectivity system can be used to communicate messages based on defined protocols to activate communication sessions and command-driven session for providing functionality described herein.

The smart assistant device application executing on the smart assistant device receives the unique identifier. The smart assistant device application can refer to an agent that supports a set of developer defined features and functionality on the smart assistant device. The digital assistant server can facilitate interoperability between a smart assistant device and the digital assistant device using smart assistant server application Application Programming Interfaces (APIs) or voice-driven enhancements of the smart assistant application server. The smart assistant application server can in particular enable user to connect third-party command-driven service to the smart assistant device.

The smart assistant device application can generate a pairing command which includes the unique identifier. Based on receiving the unique identifier at the smart assistant device application, the smart assistant device application communicates a pairing command, which includes the unique identifier, to a smart assistant server application executing on a smart assistant server. The smart assistant server application is an application that supports providing intelligent assistant services (e.g., a voice-controlled intelligent personal assistant service). The smart assistant server application can help implement the smart assistant device as a home automation hub that support controls and automation of lighting, heating (such as smart thermostats), ventilation, air conditioning (HVAC), and security, as well as home appliances.

The smart assistant server application initiates communications with the digital assistant server application executing on the digital assistant server. The digital assistant server application implements a third-party command-driven service for communicating with digital assistant device applications executing on digital assistant devices. By way of example, the Amazon® Alexa® smart assistant service (i.e., smart assistant server application) can provide a "skills" feature that enables users to employ third-party command-driven services (e.g., requesting a rideshare service) by way of the Amazon® Echo® smart assistant device. In this regard, operations using a connection (e.g., a communication session) between the smart assistant device and the digital assistant server can be processed using the smart assistant server application. By way of background, a connection to the third-party command-driven service executing via the smart assistant server application and the smart assistant server can be initiated by stating a command that corresponds to the third-party command-driven service. As such, a connection to the digital assistant server can easily be initiated by registering, with the smart assistant server application, the digital assistant server application as a third-party voice driven service.

By way of example, a command such as "open action," may be registered with the smart assistant server application as a command to initialize a connection between the smart assistant device and the digital assistant server. The examples described herein are not intended to be limiting in any way, and it is contemplated that alternative techniques for employing third-party command-driven services via a smart assistant device, and for establishing connections there between, are within the purview of the present disclosure. Further, it is contemplated that any reference to a service, application or component described herein is provided in conjunction with a corresponding server or device. For example, a digital assistant device service can be provided by way of one or more digital assistant servers or device. Moreover, any reference to a server can also reference the corresponding service, application or component provided by the recited server.

Based on initiating communications between the smart assistant server application and digital assistant server application, a communication session is established between the digital assistant server application (i.e., third-party command-driven service) and the smart assistant device application. Establishing the communication session is based on communicating from the smart assistant server application to the digital assistant server application at least a portion of the pairing command that includes the unique identifier, while initiating communications. Based on the digital assistant server application receiving at least a portion of the pairing command, the digital assistant server application establishes a command-driven session (e.g., voice-command-driven session) between the digital assistant device application and the smart assistant device application.

In an exemplary implementation, the command to initialize the connection can include a parameter. In this regard, the digital assistant server application can be configured to either wait for a pairing code (i.e., a unique identifier associated with a digital assistant device) or receive the pairing code as part of the command. The combined command and pairing code may be described as a pairing command in accordance. As such, and by way of example only, a command to initialize the connection to the digital assistant server application (e.g., "open action") paired with a unique identifier (e.g., "X3G1G9"), or any variation thereof, can be interpreted by the smart assistant device as the command to initiate communications between the smart assistant server application and the digital assistant server application, and the smart assistant server application pass the unique identifier as a parameter to the digital assistant server application for establishing a connection session between the digital assistant server application and the smart assistant device application, so as to be able to execute the action on the specific digital assistant device (i.e., a particular instance of the digital assistant device application on a particular digital assistant device).

In an exemplary implementation, the digital assistant server application, based on the paring command having the unique identifier, verifies and authenticates that the digital assistant device that is to be paired with the smart assistant device. Initiating the communication session and establishing the command-driven session allows commands from the smart assistant device to be relayed through the smart assistant server and digital assistant server (i.e., communication session), so that the digital assistant server analyzes the received command from the smart assistant device (i.e., command-driven session) as if it were received directly from the digital assistant device associated with the received unique identifier. The digital assistant server can now invoke a specific action, or transfer the specific command to the digital assistant device for action invocation using the digital assistant device application.

The digital assistant connectivity system can support recording a connection between devices and authenticating a command-driven session based on the record of the connection between devices. Initially, when the digital assistant device and the smart assistant device have an established command-driven session, it is contemplated that one or both of the digital assistant device and the smart assistant device are communicatively coupled to the digital assistant server to communicate successful establishment of the connection or pairing. Upon communicating successful pairing, the digital assistant server can store a record of the link between the devices. In particular, if an account service account is used as part of pairing one or more digital assistant devices, the record of the link between the devices can identify the account that is associated with the paired devices. In this regard, the unique identifier, the digital assistant device, the smart assistant device, a session identifier, and an account can be an exemplary record indicating the link between the devices. The unique identifier can be referenced in the record for processing operations between the corresponding devices in the record.

The digital assistant connectivity system can also support performing different operations between the digital assistant device, the smart assistant device, the smart assistant server and the digital assistant server upon establishing a connectivity sessions between the devices. The smart assistant device can receive commands to perform actions on the linked digital assistant device. For example, the smart assistant device can receive a voice command to perform actions on the corresponding digital assistant device. Several different types of communications are contemplated for transmitting a request to perform an action on the digital assistant device for a command received at the smart assistant device. The digital assistant server is operable to communicate an instruction to the digital assistant device to perform the corresponding action. The action can be associated with a series of operations that are defined by the action that are mapped to the command that was received at the smart assistant device.

In addition, it is contemplated that the digital assistant device is operable to receive communications from the digital assistant server at any time when a network connection between the digital assistant device and the digital assistant server is available. For instance, a push event can be sent from the digital assistant server to the digital assistant device. In another instance, a message or other signal that is recognizable by the digital assistant device can be communicated by the digital assistant server to a known network address of the digital assistant device. It is contemplated that any known method for establishing communications from a server to a client device is within the purview of the present disclosure.

The smart assistant server application can detect a command to close the established connection with the digital assistant server application. For example, a command such as "close action," can be received by the smart assistant device, and interpreted by the smart assistant server application to close the established connection to the digital assistant server application. In this regard, a closure of the established connection can naturally cause the digital assistant server application to terminate the command-driven session (e.g., voice-command-driven session) between the smart assistant device and the paired digital assistant device. In the alternative, the connection with a specific paired digital assistant device can be maintained as open and persistent, until explicitly disabled through a special command to the smart assistant device, or when a new digital assistant device is requesting a connection.

The digital assistant connectivity system can support multiple digital assistant devices concurrently connected or paired with the smart assistant device, and a single voice command can be used to initiate actions on one or multiple digital assistant devices at the same time. For example, at a party, or for a group of students, or for remote presentations and demonstration purposes a plurality of digital assistant devices can have an action triggered on them by way of a single command from the smart assistant device. In such situations, it is possible that the digital assistant device are executing or invoking actions on different mobile platforms (e.g., iOS or Android).

The digital assistant connectivity system can also support the capacity for the smart assistant server application to detect another command to open a connection with a second digital assistant device while a first connection is already established to a first digital assistant device. In some aspects, the smart assistant server application can terminate the first established connection based on the received command. In some other aspects, the smart assistant server application can maintain the first established connection if a different unique identifier is not included with the received command. In some further aspects, the smart assistant server application can terminate the first established connection and immediately establish a new connection, passing a new unique identifier to the digital assistant server application to initiate a new command-driven session (e.g., voice-commanddriven session) between the smart assistant device and a second digital assistant device associated with the new unique identifier.

Advantageously, the described techniques and system provide for an intuitive and hassle-free method for connecting multiple digital assistant devices to a single smart assistant device, and in some cases repurposing a smart assistant device account or a set of smart assistant accounts to connect the digital assistant devices. The digital assistant connectivity system uses unconventional protocols to communicate a unique identifier and initiate communications and establish a communication connection and a command-driven session for managing and processing commands and performing actions. In contrast to the cumbersome and potentially insecure framework provided by conventional smart assistant services, the digital assistant connectivity system supports techniques for quickly pairing or un-pairing multiple mobile devices to a smart assistant. The defined protocols prevent broad preemption of protocols for automated digital assistant connectivity for digital assistant components.

In addition, the stored record of the unique identifier and corresponding information (e.g., session identifier, digital assistant device and smart assistant device) operate to improve the operation of the digital assistant server via the digital assistant server application as the record is referenced for faster verification and authentication of the connectivity between the digital assistant device and the smart assistant device. Moreover, based on the established command-driven session between the digital assistant device and the smart assistant device, the smart assistant device can operate to receive voice-driven commands to execute actions on the digital assistant device. In this regard, disclosed embodiments can enable the unconventional execution and invocation of actions on digital assistant devices via a smart assistant device.

The protocols and operations for automatically connecting a digital assistant device and a smart assistant device are not conventional in the technology field and the digital assistant connectivity system addresses a technological problem of connecting multiple digital assistant devices a single smart assistant device by implementing a solution specific to that technological environment. The solution is also different from the manner suggested by routine or conventional use within the field in that the connectivity is configured for interoperability between a smart assistant device a plurality of digital assistant devices and performing actions on the digital assistant devices via the smart assistant device. As such, this invention presents an improvement to the computing operations of automatic digital assistant connectivity and an improvement to the overall technology field of digital assistant connectivity for providing digital assistant services.

With reference to FIG. 1, FIG. 1 illustrates an exemplary digital assistant connectivity system 100 in which implementations of the present disclosure may be employed. In particular, FIG. 1 shows a high level architecture of digital assistant connectivity system 100 having components in accordance with implementations of the present disclosure. It should be understood that this and other arrangements described herein are set forth only as examples. In addition, a system, as used herein, refers to any device, process, or service or combination thereof. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed can be performed in a distributed manner. The system may be formed from other systems and components thereof. It should be understood that this and other arrangements described herein are set forth only as examples.

Among other components or generators not shown, digital assistant connectivity system 100 includes a digital assistant device 110, a digital assistant server 120, a smart assistant 130 and a smart assistant server ("device components" and "server components" accordingly). The device components and server components can further include applications (e.g., applications 112, digital assistant device application 114, applications 122, digital assistant server application 122, applications 132, smart assistant device application 134, and smart assistant server application 142.

The one or more applications include any application that is executable on the device components and server components and can include applications installed via an application marketplace, custom applications, web applications, side-loaded applications, applications included in the operating system of the device components and server components, or any other application that can be reasonably considered to fit the general definition of an application. Applications can further be depicted or referred to as components with reference to the figures, where components can be hardware or software components providing the functionality described herein. As shown, a database 124 can be directly coupled to the digital assistant server 120, while alternatively in some embodiments the database 124 is coupled to the server 120 via the network 130.

The components of the digital assistant connectivity system 100 may communicate with each other over one or more networks (e.g., public network or virtual private network "VPN"). The network 130 may include, without limitation, one or more local area networks (LANs) and/or wide area networks (WANs). The computing devices can be a client computing device that corresponds to the computing device described herein with reference to FIG. 6. The components of the digital assistant connectivity system 100 can operate together to provide functionality for automated digital assistant connectivity described herein.

Figure 2:
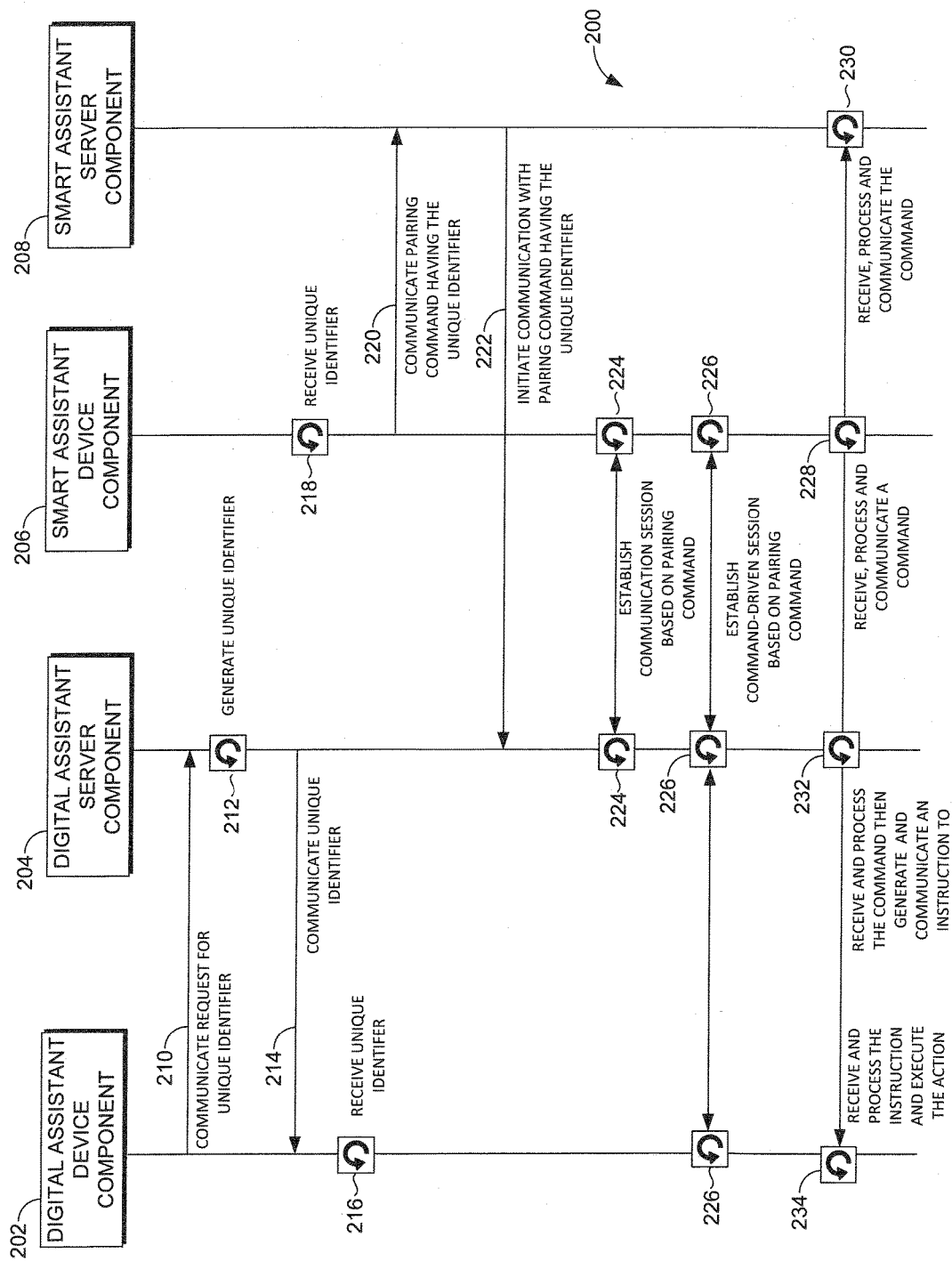
FIG. 2 is a flow diagram illustrating an exemplary implementation of a digital assistant connectivity system in accordance with some embodiments of the present disclosure.

Embodiments of the present invention can further be described with reference to FIG. 2, where FIG. 2 further illustrates device components (i.e., digital assistant device component 202, smart assistant device component 206) and server components (i.e., digital assistant server components 204 and smart assistant server component 208) corresponding to devices and servers in FIG. 1. The device components or server components, as shown in FIG. 2, can represent applications executing on the device components and server components that implement the protocols for providing digital assistant connectivity.

In operation, a request to receive a unique identifier is communicated 210 from the digital assistant device component 202, of a digital assistant device, to a digital assistant server component 204 of a digital assistant server. The unique identifier is requested such that the unique identifier is utilized to pair the digital assistant device with a smart assistant device. The unique identifier is generated 212 at the digital assistant server component 204 to correspond with the digital assistant device. The unique identifier is communicated 214 to the digital assistant device component 202 from the digital assistant server component 204. The digital assistant device component receives 216 the unique identifier.

The unique identifier is then received 218 at the smart assistant device component 206 of the smart assistant device. Based on receiving the unique identifier at the smart assistant device component 206, the smart assistant device component 206 communicates 220 a pairing command, which includes the unique identifier, to the smart assistant server component 208 of the smart assistant server.

The pairing command is communicated to the smart assistant server component 208 for the smart assistant server component 208 to initiate 222 communications with the digital assistant server component 204. The digital assistant server component 204 operates to implement a third-party command-driven service for communicating with digital assistant device components of digital assistant devices. Based on receiving the pairing command, the smart assistant server component 208 initiates 222 communication with the digital assistant server component 204 (i.e., third-party command driven service).

Based on initiating 222 communications between the smart assistant server component 208 and digital assistant server component 204, a communication session is established 224 between the digital assistant server component 204 and the smart assistant device component 206. Establishing the communication session is based on communicating from the smart assistant server component 208 to the digital assistant server component 204 at least a portion of the pairing command that includes the unique identifier, while initiating 222 communications. Based on the digital assistant server component 204 receiving at least a portion of the pairing command, the digital assistant server component 204 establishes 226 a command-driven session (e.g., voice-command-driven session) between the digital assistant device component 202 and the smart assistant device component 202.

The smart assistant device component 206 receives, processes and communicates 228 a command to the smart assistant server component 208. The smart assistant server component 208 receives, processes and communicates 230 the command digital assistant server component 204. The digital assistant server component 204 receives and processes the command and then generates and communicates 232 an instruction to perform an action on the digital assistant device component 202. The instruction is communicated to the digital assistant device application based on the command-driven session between the digital assistant device application and the smart assistant device application. The digital assistant device component 202 receives and processes the instruction and then executes 234 the action. The action is executed on the digital assistant device in response to receiving the instruction to perform the action. The action is executed by the digital assistant device component 202 on the digital assistant device.

Figure 3:
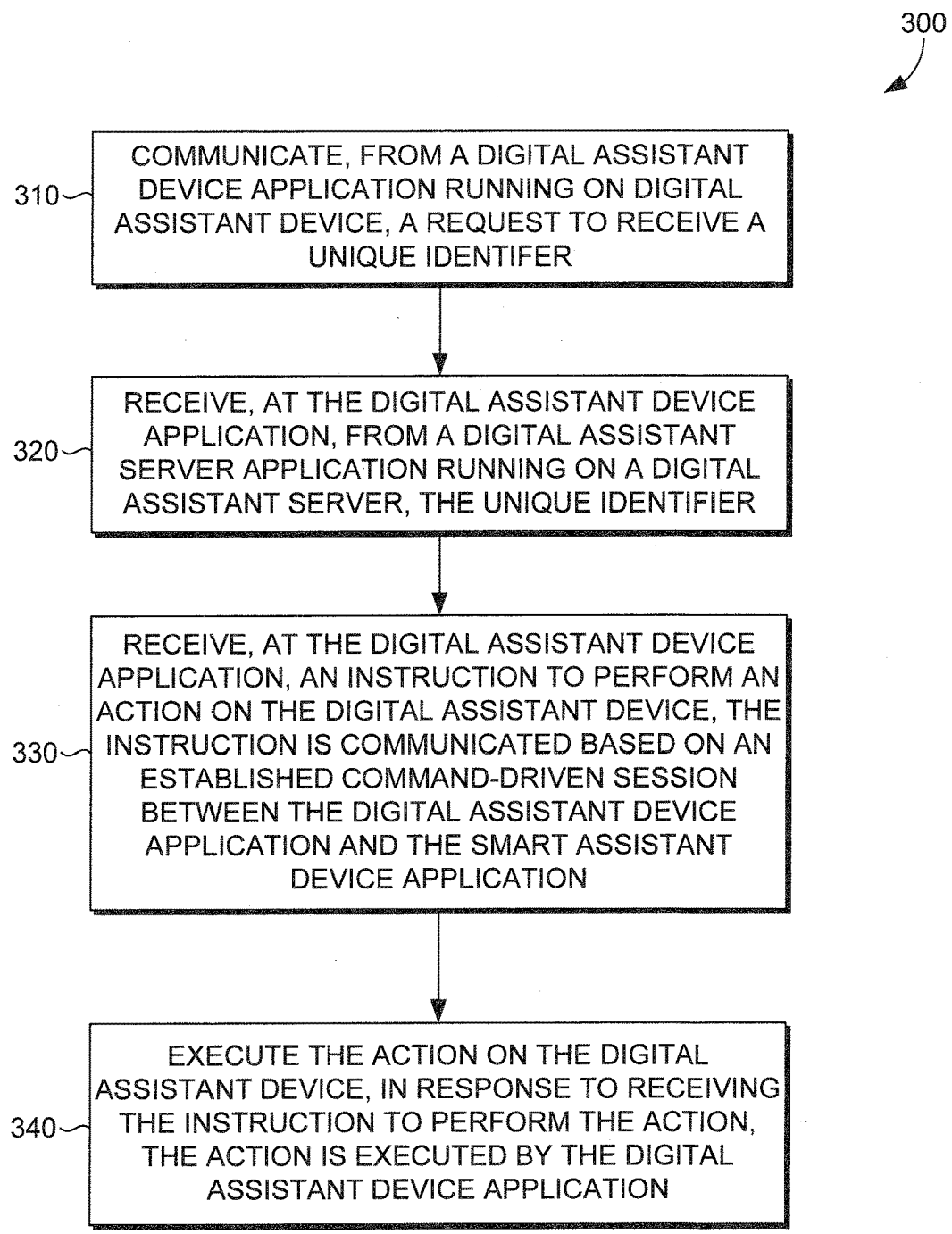
FIG. 3 is a flow diagram illustrating an exemplary implementation of a digital assistant connectivity system in accordance with some embodiments of the present disclosure.
Figure 4:
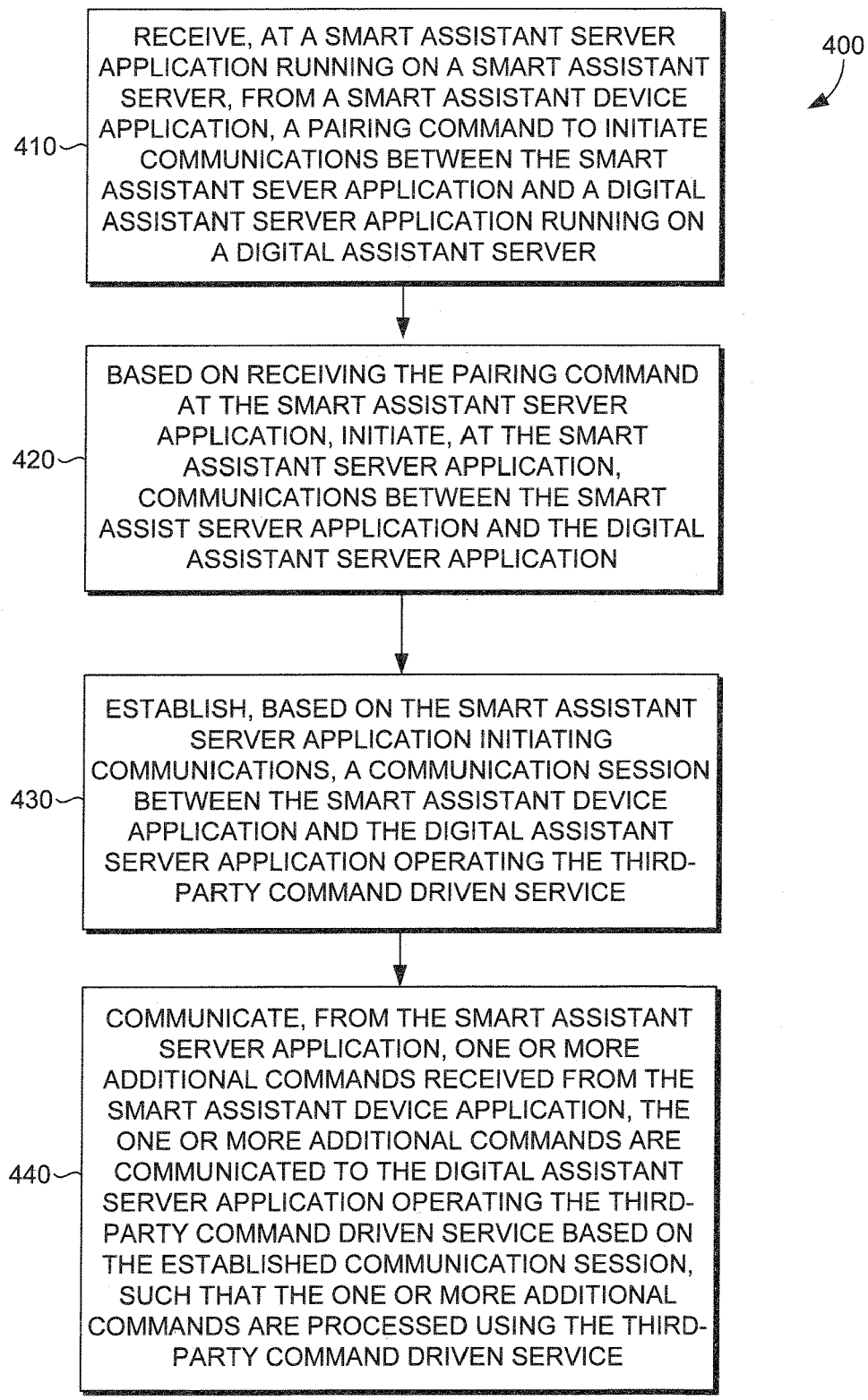
FIG. 4 is a flow diagram illustrating an exemplary implementation of a digital assistant connectivity system in accordance with some embodiments of the present disclosure.
Figure 5:
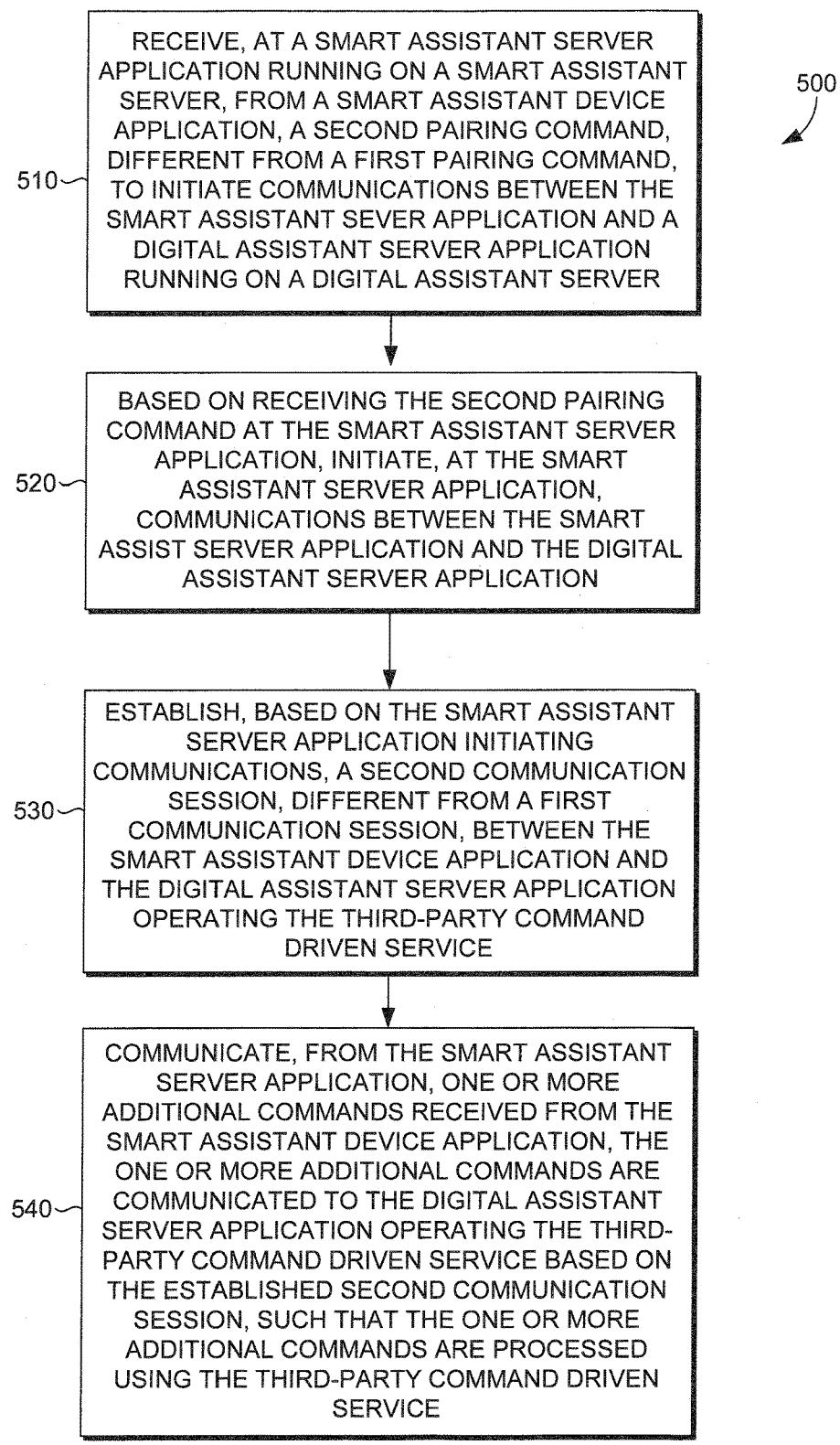
FIG. 5 is a flow diagram illustrating an exemplary implementation of a digital assistant connectivity system in accordance with some embodiments of the present disclosure.

With reference to FIGS. 3, 4 and 5, flow diagrams are provided illustrating methods for implementing a digital assistant connectivity system. The methods can be performed using the digital assistant connectivity system described herein. In embodiments, one or more computer storage media having computer-executable instructions embodied thereon that, when executed, by one or more processors, can cause the one or more processors to perform the methods in the digital assistant connectivity system.

Turning to FIG. 3, a flow diagram is provided that illustrates a method 300 for implementing a digital assistant connectivity system. Initially at block 310, a request to receive a unique identifier is communicated from a digital assistant device application executing on digital assistant device. The unique identifier is utilized to pair the digital assistant device application with a smart assistant device application executing on a smart assistant device.

At block 320, the unique identifier is received, at the digital assistant device application from a digital assistant server application executing on a digital assistant server. The unique identifier is generated by the digital assistant server application to correspond with the digital assistant device application and the digital assistant device.

The unique identifier is stored, via the digital assistant server, in association with a digital assistant device identifier, a smart assistant device identifier, and a command-driven session identifier, to authenticate the command-drive session between the digital assistant device and the smart assistant device for generating instructions to perform actions. Receiving the unique identifier, smart assistant device application via the smart assistant device, is based on a voice command comprising the unique identifier.

At block 330, an instruction to perform an action on the digital assistant device is received, at the digital assistant device application. The instruction is communicated based on an established command-driven session between the digital assistant device application and the smart assistant device application. The command-driven session is associated with the unique identifier that paired the digital assistant device application and the smart assistant device application. The command-driven session can be a voice-command-driven session. The voice-command-driven session and the second voice-command-driven session are concurrent.

At block 340, the action on the digital assistant device is executed, in response to receiving the instruction to perform the action, the action is executed by the digital assistant device application. The instruction is generated at the digital assistant server application based on: receiving, at the smart assistant device application, a command, communicating the command to the smart assistant server application, based on a third-party command driven service association between the command and the digital assistant server application, relaying the command to the digital assistant server application, and based on the command, generating the instruction to perform an action on the digital assistant device.

Turning to FIG. 4, a flow diagram is provided that illustrates a method 400 for implementing a digital assistant connectivity system. Initially at block 410, a pairing command to initiate communications between the smart assistant server application and a digital assistant server application executing on a digital assistant server is received from a smart assistant device application at a smart assistant server application executing on a smart assistant server. The digital assistant server operates a third-party command driven service configured to communicate with digital assistant device applications operating on digital assistant devices.

The pairing command comprises a first unique identifier that corresponds to the digital assistant device application executing on a first digital assistant device of the plurality of digital assistant devices. At least the portion of the pairing command communicated to the digital assistant server application comprises the first unique identifier. Based at least in part on receiving the first unique identifier, the digital assistant server application operating the third-party command driven service is configured to facilitate a voice-command-driven session between the digital assistant device application of the first digital assistant device and the smart assistant device.

At block 420, based on receiving the pairing command at the smart assistant server application, communications between the smart assist server application and the digital assistant server application are initiated at the smart assistant server application.

At block 430, a communication session between the smart assistant device application and the digital assistant server application operating the third-party command driven service is established, based on the smart assistant server application initiating communications. At least a portion of the pairing command is communicated to the digital assistant server application.

At block 440, one or more additional commands received from the smart assistant device application are communicated, from the smart assistant server application. The one or more additional commands are communicated to the digital assistant server application operating the third-party command driven service based on the established communication session, such that the one or more additional commands are processed using the digital assistant server application operating the third-party command driven service.

The digital assistant server application generates instructions to perform actions associated with the one or more additional commands based on the same process or mechanism that is used to generate instructions for commands received directly from digital assistant device application of a selected digital assistant device of the plurality of digital assistant devices, the selected digital assistant corresponding to the unique identifier included in the pairing command.

Turning to FIG. 5, a flow diagram is provided that illustrates a method 500 for implementing a digital assistant connectivity system. Initially a block 510, a second pairing command to initiate communications with the third-party command-driven service is received, from the smart assistant device application, at the smart assistant server application executing on the smart assistant server. The second pairing command is different from a first pairing command previously received.

At block 520, communications between the smart assist server application and the digital assistant server application are initiated at the smart assistant server application based on receiving the second pairing command at the smart assistant server application.

At block 530, a second communication session between the smart assistant device application and the digital assistant server application operating the third-party command driven service is established, based on the smart assistant server application initiating communications. The second communication session is different from a first communication session previously established. At least a portion of the second pairing command is communicated to the digital assistant server application operating the third-party command driven service.

At block 540, one or more additional commands received from the smart assistant device application are communicated, by the smart assistant server application. The one or more additional commands are communicated to the digital assistant server application operating the third-party command driven service based on the established second communication session, such that the one or more additional commands are processed using the digital assistant server application operating the third-party command driven service.

With reference to the digital assistant connectivity system 100, embodiments described herein support automatically connecting computing devices, in particular, connecting a digital assistant device to a smart assistant for performing digital assistant device services. The digital assistant connectivity system components refer to integrated components that implement the image search system. The integrated components refer to the hardware architecture and software framework that support functionality using the digital assistant connectivity system components. The hardware architecture refers to physical components and interrelationships thereof and the software framework refers to software providing functionality that can be implemented with hardware operated on a device. The end-to-end software-based digital assistant connectivity system can operate within the other components to operate computer hardware to provide digital assistant connectivity system functionality. As such, the digital assistant connectivity system components can manage resources and provide services for the digital assistant connectivity system functionality. Any other variations and combinations thereof are contemplated with embodiments of the present invention.

By way of example, the digital assistant connectivity system can include an API library that includes specifications for routines, data structures, object classes, and variables may support the interaction the hardware architecture of the device and the software framework of the digital assistant connectivity system. These APIs include configuration specifications for the digital assistant connectivity system such that the components therein can communicate with each other for automatic digital assistant connectivity, as described herein.

Figure 6:
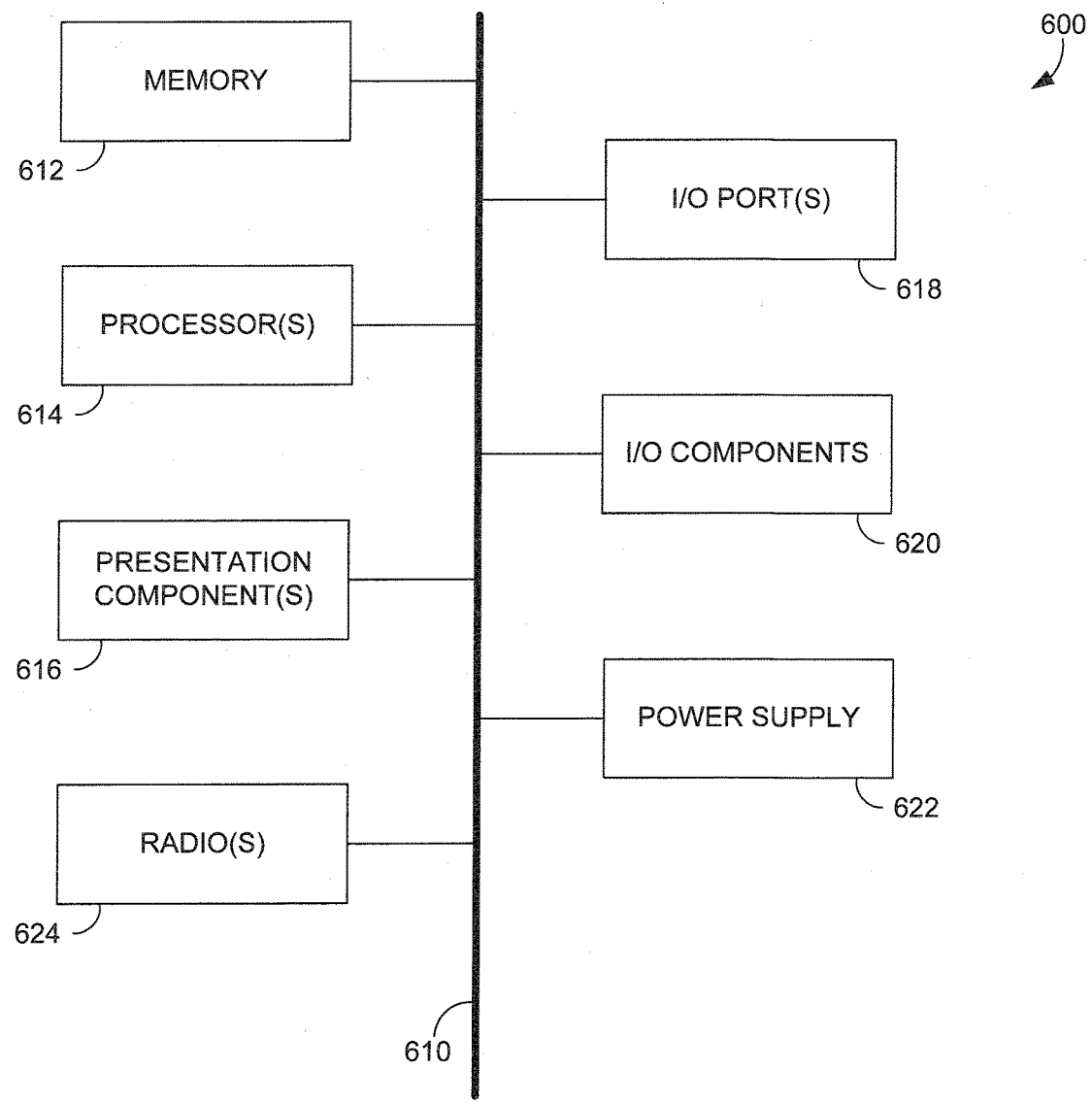
FIG. 6 is a block diagram of an exemplary computing environment suitable for use in implementing some embodiments of the present disclosure.

Having identified various component of the digital assistant connectivity system 600, it is noted that any number of components may be employed to achieve the desired functionality within the scope of the present disclosure. Although the various components of FIG. 6 are shown with lines for the sake of clarity, in reality, delineating various components is not so clear, and metaphorically, the lines may more accurately be grey or fuzzy. Further, although some components of FIG. 6 are depicted as single components, the depictions are exemplary in nature and in number and are not to be construed as limiting for all implementations of the present disclosure. The digital assistant connectivity system 600 functionality can be further described based on the functionality and features of the above-listed components.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 124 (or similar wireless communication components). The radio 624 transmits and receives radio or wireless communications. The computing device 600 may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

As can be understood, embodiments of the present invention provide for, among other things, optimizing digital assistant connectivity. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A computer-implemented method for providing digital assistant connectivity, comprising:
communicating, by a digital assistant device, a unique identifier request to a digital assistant server via a digital assistant application installed on the digital assistant device;
receiving, by the digital assistant device, a unique identifier from the digital assistant server via the installed digital assistant application, the received unique identifier corresponding to the digital assistant device based on the communicated unique identifier request, wherein the digital assistant server is configured to generate the unique identifier in response to the communicated unique identifier request;
receiving, by the digital assistant device, an instruction to perform an automated action from the digital assistant server via the installed digital assistant application based on a communication of the instruction from a smart assistant device paired to the digital assistant server, wherein the automated action is associated with a different application installed on the digital assistant device, and the smart assistant device is paired to the digital assistant server based on the generated unique identifier; and
executing, by the digital assistant device via the installed digital assistant application, a set of steps associated with the automated action in response to the received instruction, wherein the set of steps includes launching the installed different application, invoking a defined operation of the launched different application, and passing a set of parameters included in the received instruction to the launched different application.

2. The method of claim 1, wherein the digital assistant server is configured to store the generated unique identifier with each of a digital assistant device identifier that corresponds to the digital assistant device, a smart assistant device identifier that corresponds to the smart assistant device, and a command-driven session identifier that corresponds to an established pairing between the digital assistant device and the smart assistant device, each being stored to authenticate the command-driven session between the digital assistant device and the smart assistant device.

3. The method of claim 1, wherein the smart assistant device is configured to pair with the digital assistant server, via a smart assistant server, based at least in part on a received pairing command comprising the generated unique identifier.

4. The method of claim 3, wherein the pairing command is received based on a detected voice command.

5. The method of claim 3, wherein the digital assistant server is further configured to communicate the instruction to the digital assistant device based on a recognition of the generated unique identifier included in the received pairing command.

6. The method of claim 3, wherein the instruction is communicated via the smart assistant server based at least in part on a third-party command driven service associated with the digital assistant server.

7. The method of claim 1, wherein the paired smart assistant device is configured to communicate instructions to the digital assistant server based on detected voice commands.

8. One or more computer storage media having computer-executable instructions embodied thereon that, when executed, by one or more processors, cause the one or more processors to perform a method comprising:
receiving a pairing command from a smart assistant device, the pairing command including a unique identifier that corresponds to a digital assistant device having a digital assistant application installed thereon;
establishing a network connection to a digital assistant server associated with the digital assistant device based on the received pairing command;
communicating the unique identifier included in the received pairing command to the digital assistant server via the established network connection, wherein the digital assistant server is configured to establish a communication session between the smart assistant device and the corresponding digital assistant device based on the communication;
communicating another command received from the smart assistant device to the digital assistant server via the established network connection; and
causing the digital assistant device to automatically execute a set of steps via the installed digital assistant application, utilizing a different application installed on the digital assistant device, and corresponding to the other command based on the received other command being communicated to the digital assistant device via the established communication session, wherein the set of steps includes launching the installed different application, invoking a defined operation of the launched different application, and passing a set of parameters included in the received other command to the launched different application.

9. The media of claim 8, wherein the received pairing command corresponds to a third-party command driven service of the digital assistant server.

10. The media of claim 9, wherein the pairing command is received from the smart assistant device as speech input, and wherein the unique identifier included in the received pairing command is communicated to the digital assistant server based on a conversion of the included unique identifier to text.

11. The media of claim 8, wherein the communication session between the smart assistant device and the corresponding digital assistant device is established via the digital assistant server.

12. The media of claim 11, wherein the digital assistant device is configured to receive the corresponding unique identifier from the digital assistant server based on a unique identifier request communicated from the digital assistant device to the digital assistant server.

13. The media of claim 8, wherein the smart assistant device is voice-operated, the digital assistant device is a mobile phone, and the installed digital assistant application causes the digital assistant device to be voice-operated.

14. The media of claim 8, wherein the set of parameters included in the received other command is passed to a set of form fields presented via the launched different application.

15. A digital assistant connectivity system, the system comprising:

a digital assistant device having a digital assistant application and a different application installed thereon, the digital assistant device to:

receive, from a digital assistant server, an instruction to perform an automated action associated with the installed different application, via the installed digital assistant application on the digital assistant device based on a command-driven session, the command-driven session being established by the digital assistant server between the digital assistant device and a voice-operated smart assistant device, wherein the digital assistant server is configured to establish the command-driven session based at least in part on a pairing command that is received from the voice-operated smart assistant device and determined to include a unique identifier corresponding to the digital assistant device; and automatically execute a set of steps associated with the automated action via the installed digital assistant application utilizing the associated installed different application based on the received instruction, wherein the set of steps includes launching the associated installed different application, invoking a defined operation of the launched different application, and passing a set of parameters included in the received instruction to the launched different application.

16. The system of claim 15, wherein the digital assistant server is further configured to generate the instruction based on a command received from the voice-operated smart assistant device.

17. The system of claim 16, wherein the command is received via a smart assistant server in communication with the voice-operated smart assistant device.

18. The system of claim 16, wherein the smart assistant server is configured to forward the command to the digital assistant server.

19. The system of claim 15, wherein the set of parameters included in the received instruction is passed to a set of form fields presented via the launched different application.

* * * * *